W. F. FOLMER.
GEAR CUTTING MACHINE.
APPLICATION FILED DEC. 12, 1914.
1,221,303.
Patented Apr. 3, 1917.
4 SHEETS—SHEET 1.
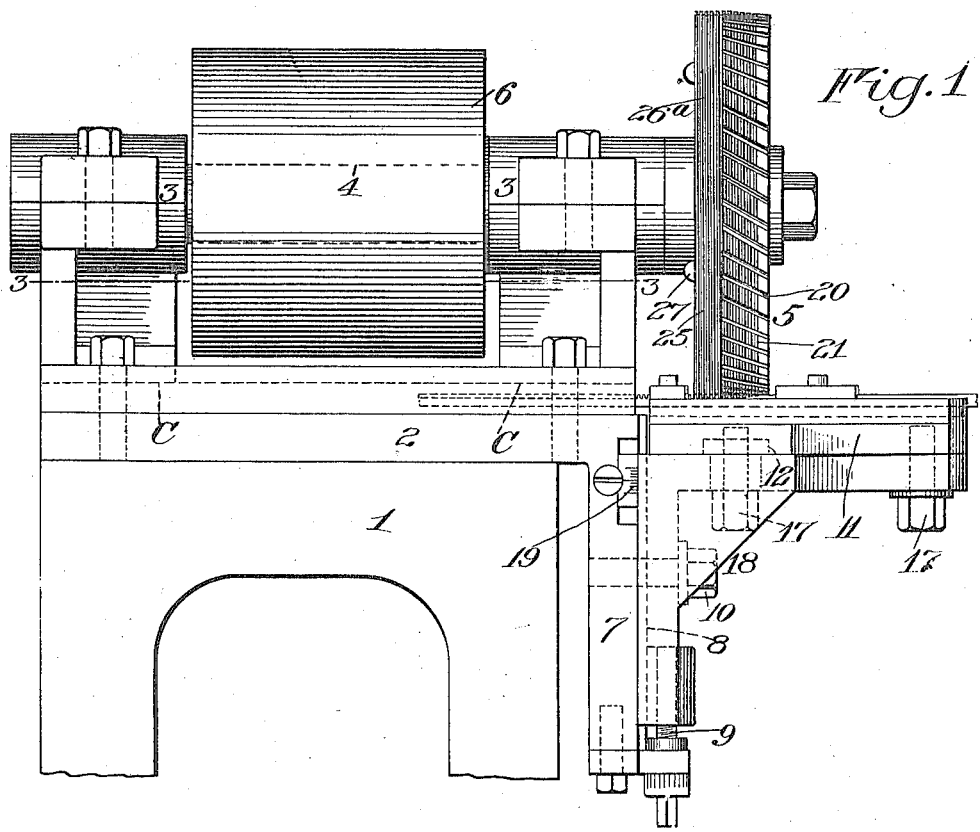
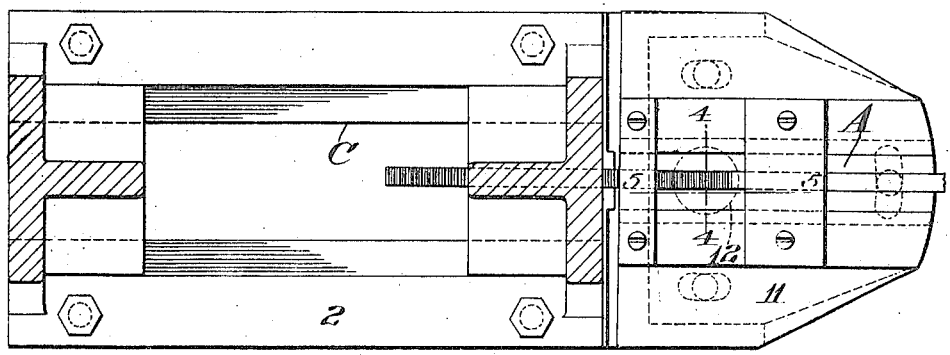

W. F. FOLMER.
GEAR CUTTING MACHINE.
APPLICATION FILED DEC. 12, 1914.
1,221,303.
Patented Apr. 3, 1917
4 SHEETS—SHEET 2.
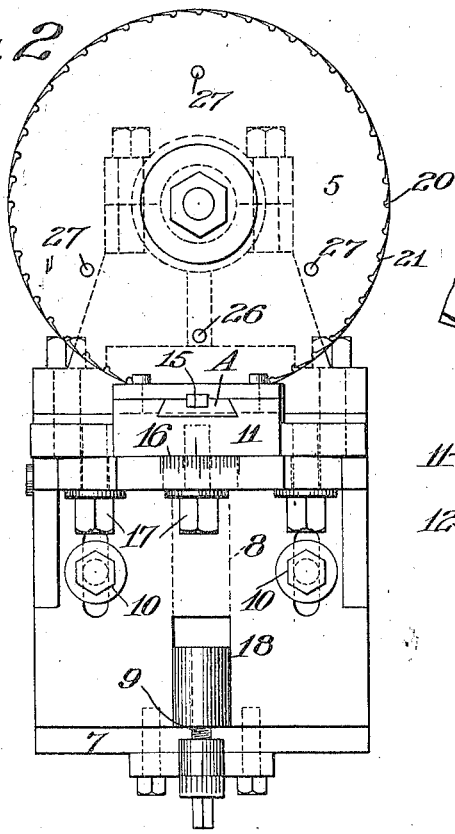
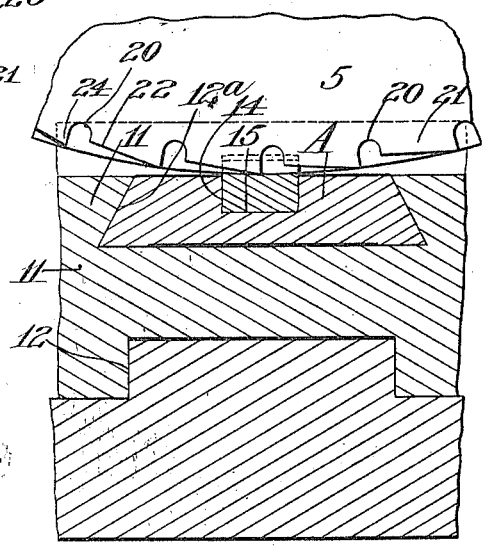
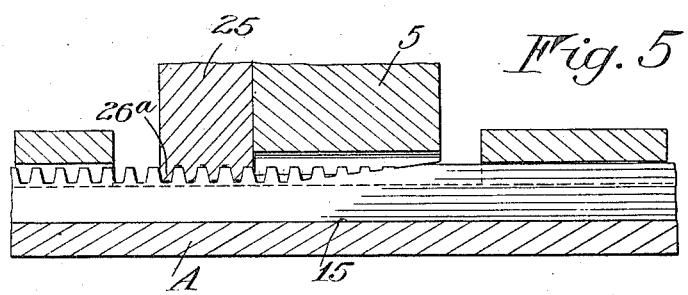
Witnesses
Walter B. Payne
Nelson H. Copp
Inventor
William F. Folmer
By Church & Rich
his Attorneys

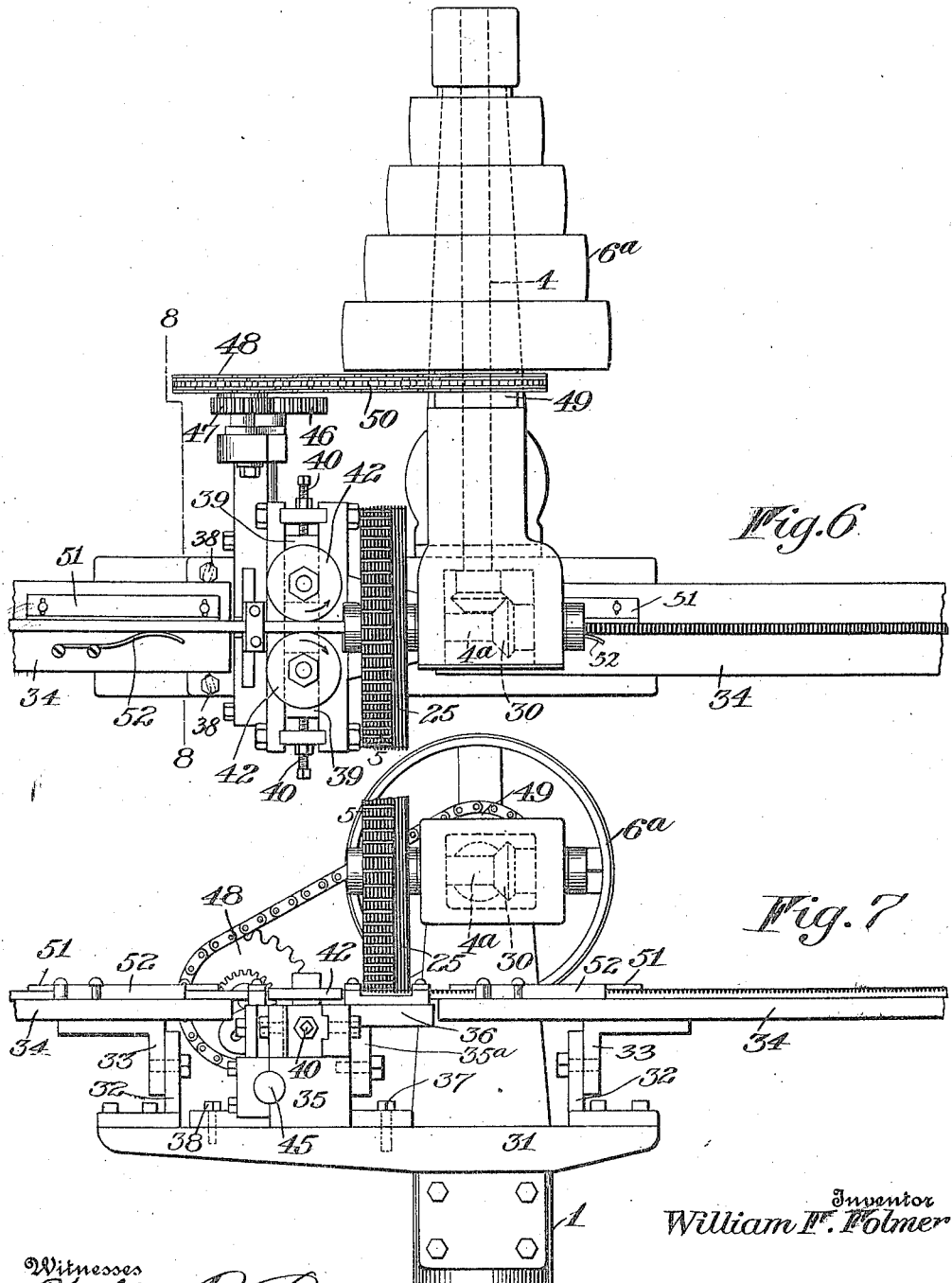

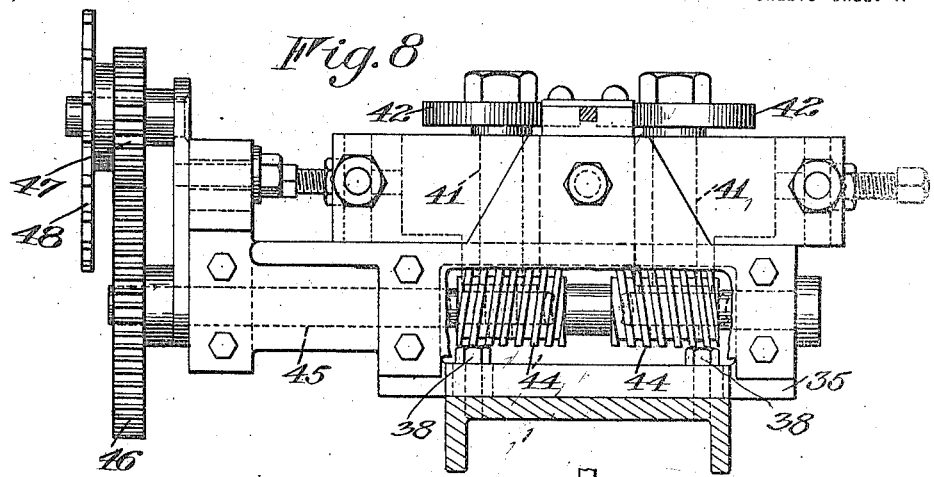
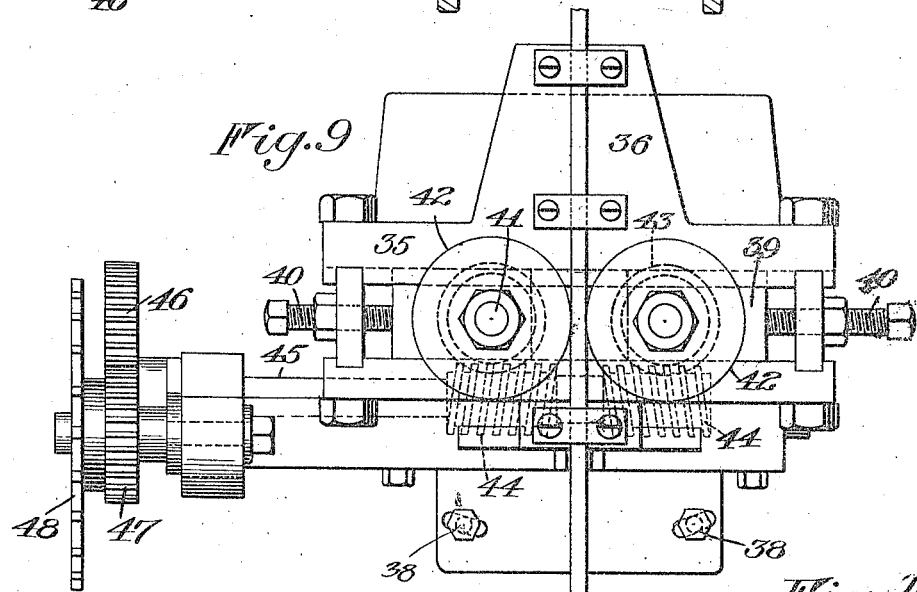
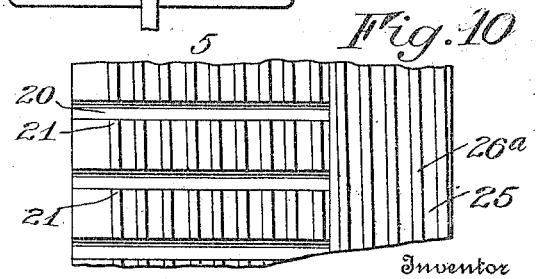

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

GEAR-CUTTING MACHINE.

1,221,303.

Specification of Letters Patent.

Patented Apr. 3, 1917.

Application filed December 12, 1914. Serial No. 876,965.

*To all whom it may concern:*

Be it known that I, WILLIAM F. FOLMER, of Rochester, in the county of Monroe and State of New York, have invented certain new and useful Improvements in Gear-Cutting Machines; and I do hereby declare the following to be a full, clear, and exact description of the same, reference being had to the accompanying drawings, forming a part of this specification, and to the reference numerals marked thereon.

My present invention relates to gear cutting mechanism and it has for its special object to provide a simple and durable machine which is capable of cutting gear teeth with extreme accuracy and speed. A further object is to provide a cutter member for gradually increasing the depth of cut in the work piece by a continuous progressive action and, working in conjunction with said cutter, a work advancing member coöperating with the teeth as they are completed by the cutter. The invention also includes a work guide having certain adjustable features whereby a proper conjoint action between the cutter and work piece may be effected. To these and other ends the invention consists in certain improvements and combinations of parts, all as will be hereinafter more fully described, the novel features being pointed out in the claims at the end of the specification.

In the drawings:

Figure 1 is a side elevation of a gear cutting machine constructed in accordance with and illustrating one embodiment of my invention, the machine being adapted for cutting rack bars;

Fig. 2 is a front view thereof;

Fig. 3 is a sectional plan view on the line 3—3 of Fig. 1;

Fig. 4 is an enlarged sectional view on the line 4—4 of Fig. 3;

Fig. 5 is a similar view on the line 5—5 of Fig. 3;

Fig. 6 is a plan view of a modified structure;

Fig. 7 is a front view thereof;

Fig. 8 is a vertical sectional view on the line 8—8 of Fig. 6;

Fig. 9 is a plan view showing the feed rollers and their driving mechanism in detail, and Fig. 10 is an enlarged face view of the cutter.

Similar reference numerals throughout the several figures indicate the same parts.

In illustrating my present invention, I have shown a machine especially adapted for the formation of rack bars and which was designed for cutting racks for the focusing mechanism of camera beds. In carrying out the invention, as illustrated in the present embodiment, I employ a rotary cutting member or hob provided with helically arranged cutting teeth coöperating with a work strip fed to the cutter in a direction substantially parallel to the axis thereof. A work advancing screw arranged adjacent the cutting member and revolving therewith, engages the completed teeth on the work strip as it passes said cutting member and feeds the strip at a uniform speed. The work guide and cutter are adjustable relatively toward and from each other to permit the use of stock of differing thicknesses and angularly adjustable about the point at which the work piece crosses the periphery of the cutter to enable the work strip to be disposed at right angles with the direction of motion of the cutting teeth, said angular adjustment being more or less pronounced according to the pitch angle of the work advancing thread.

In the drawings, a table 1 is provided with a support 2 on which is mounted in bearings 3 a rotating shaft 4 carrying the cutting hob 5 at its outer end and driven by a pulley 6. The support 2 has a depending portion 7 on which a bracket or shelf is vertically movable on a guide 8 by adjustment of the micrometer screw 9, and is firmly secured in its adjusted position by clamping bolts 10. The work guide A is carried by a member 11 resting on the top of the bracket and pivoted on a boss 12 on the bracket located at a point substantially opposite the center of the hob 5, the guide A being thus angularly adjustable with relation to the hob about an axis extending radially through the periphery of the hob. The guide A in the present instance is made of hardened material that will resist wear and is readily removable from the ways 12ª, and embodies lateral walls 14 and a thrust wall 15. A work piece held between the lateral walls 14 becomes adjustable at an angle to the hob by swinging the member 11 about its pivot, the angle being indicated by the graduations 16 on the edge of the bracket 8, and the member 11 is secured after adjustment by the bolts 17. The thrust wall 15 is adjustable toward the axis of the shaft 4 by vertical movement of the bracket 18, the amount of movement being indicated by the graduations 19 on the depending portion 7 of the support.

The hob 5 consists of a threaded disk, fluted or grooved transversely of the threads at 20, thereby forming the separated toothed portions 21 which are backed off at 22 to provide the sharp cutting edges 24. The periphery of the hob is cut away on a conical surface, the diameter of which at the extreme end is very slightly smaller than the diameter at the root of the threads as shown in Fig. 5. From this figure, it will be seen that if the stock operated upon runs a small amount over size, the conical teeth will take off just enough to make all the teeth the proper length. The teeth on the hob being of gradually increasing length, increase the depth of the cuts in the work until by the time the latter has reached the inner end of the hob, the teeth thereon are fully formed.

The work advancing screw 25 is secured immediately adjacent the hob, to which it is secured by a dowel pin 26 and screws 27. The threads 26ª on the screw 25 engage the work just after the teeth thereon are completed by the hob and advance it at a uniform rate. On account of the power required to feed the work being distributed to several teeth, there is no undue strain brought upon any one tooth, and the smooth surfaces of the threads 26ª burnish the teeth on the rack and remove any imperfections in size or shape, which may have been caused by the cutting teeth.

The hob is made of larger diameter than the driving pulley 6 and the support 2 is recessed at C beneath the bearings 3 to permit free passage of the work piece as it is fed through the machine.

On account of the large size of the hob compared to the width of the rack tooth, the curve in the direction of length of the teeth approximates very nearly a straight line thereby reducing the theoretical error to a negligible quantity and producing a rack bar of high efficiency in operation. In case it is desired to cut racks with different sized teeth, a suitable hob is provided for each size. The pitch angle of the teeth will be different for each size, and in changing from one size hob to another it will be necessary to adjust the work guide correspondingly to dispose the direction of the work piece at a right angle to the direction in which the cutting teeth move. In some cases it may be desired to cut the teeth in the work piece at other than a right angle to its length.

In Figs. 6 to 9 I have shown a modified structure in which the work is fed positively during its insertion into the machine. In these figures, the hob shaft 4ª is arranged at a right angle to the shaft 4 carrying the driving pulleys 6ª, and is driven by means of the miter gears 30. The standard 1 has rigidly secured thereto a table 31 carrying brackets 32 on which are vertically adjustable brackets 33 carrying the shelves 34. An angularly adjustable member 35 is pivoted at 37 to the table 31 on the support at a point opposite the hob to swing about an axis extending radially through the periphery of the hob, and a bracket 35ª carrying the work guide 36 is adjustable on said member toward the axis of the hob. The guide may be adjusted at an angle to the hob by shifting the member 35 about its axis 37 and securing it by means of the bolts 38. This member 35 is provided on its upper side with a guide way in which two slides 39 are adjustable by means of set screws 40. Vertical shafts 41, journaled in said slides, carry at their upper ends driving rolls 42 bearing on opposite sides of the work piece and at their lower ends worm wheels 43 engaging worms 44 on a shaft 45 journaled in the member 35. The shaft 45 is provided at its outer end with a gear 46 meshing with a gear 47 carried on a lever arm movable about the shaft 45 as a center, said gear 47 being connected to a sprocket wheel 48 driven from a sprocket wheel 49 on the shaft 4 by means of a chain 50.

The peripheral speed of the rollers is timed to be exactly the same as that at which the screw 25 advances the work, consequently the work is fed at the proper speed when the hob begins to act upon it and the teeth are properly formed. In long strips, the work pieces are quite flexible, and it is desirable that they be guided straight for quite a distance to each side of the cutting point so as to avoid causing any stresses in the material during the cutting operation.

To this end, adjustable guides 51 are provided on both of the shelves 34 in addition to the guide 36 and springs 52 hold the work in frictional engagement with them and exert a dragging effect on the work that tends to diminish vibration.

I claim as my invention:

1. In a machine for cutting gear teeth, the combination with a support, of a cutting hob having helically arranged cutting teeth rotatably mounted on the support, and a work guide angularly adjustable with relation to the hob about an axis extending substantially radially through the periphery of the hob, one of said parts being movable about said axis as a center while the other remains fixed.

2. In a machine for cutting gear teeth, the combination with a support, of a rotatable cutter carried by the support, having cutting teeth on its periphery, a work guide for guiding a work piece across the periphery of the cutter, the work guide and cutter being relatively adjustable angularly about an axis extending substantially radially through the periphery of the cutter, and means for feeding the work piece.

3. In a machine for cutting gear teeth, the combination with a support, of a rotatable cutter carried by the support having cutting teeth on its periphery, a work guide for guiding a work piece across the periphery of the cutter, the cutter and work guide being relatively adjustable angularly about an axis substantially perpendicular to the periphery of the cutter, and means for feeding the work piece.

4. In a machine for cutting gear teeth, the combination with a support, of a rotatable cutter carried by the support having cutting teeth on its periphery, a work guide for guiding a work piece across the periphery of the cutter, adjustable with relation to the cutter about an axis extending substantially radially through the periphery thereof, and means for feeding the work piece.

5. In a machine for cutting gear teeth, the combination with a support, of a rotatable cutter carried by the support and having cutting teeth on its periphery, a bracket carried by the support and movable toward the cutter and a work guide for guiding a work piece across the periphery of the cutter, said guide being angularly adjustable upon the bracket with relation to the cutter about an axis extending substantially radially through the periphery of the cutter, and securing means for holding the work guide in adjusted relation on the bracket.

WILLIAM F. FOLMER.

Witnesses
RUSSELL B. GRIFFITH,
H. E. STONEBRAKER.